(12) United States Patent
Delvaux et al.

(10) Patent No.: US 6,490,639 B1
(45) Date of Patent: Dec. 3, 2002

(54) PERIPHERAL COMPONENT INTERCONNECT (PCI) SINGLE CHANNEL MASTER DIRECT MEMORY ACCESS (DMA) SERVING TWO SEPARATE CHANNELS

(75) Inventors: Marc Delvaux, Eatontown, NJ (US); Ronen Habot, Eatontown, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/425,396

(22) Filed: Oct. 22, 1999

Related U.S. Application Data
(60) Provisional application No. 60/111,453, filed on Dec. 9, 1998.

(51) Int. Cl.[7] ............................. G06F 3/00; G06F 13/28
(52) U.S. Cl. ............................. 710/36; 710/22; 710/40; 710/52; 711/147; 711/151
(58) Field of Search .................. 710/15, 17, 22–28, 710/36, 40, 52, 113, 305, 306, 308–310; 375/222, 223; 711/147, 151

(56) References Cited

U.S. PATENT DOCUMENTS

| | | | |
|---|---|---|---|
| 5,210,749 A | * | 5/1993 | Firoozmand .................. 370/463 |
| 5,745,684 A | * | 4/1998 | Oskouy et al. ............... 709/250 |
| 5,790,895 A | * | 8/1998 | Krontz et al. ................ 710/240 |
| 6,222,825 B1 | * | 4/2001 | Mangin et al. ............... 370/229 |
| 6,298,370 B1 | * | 10/2001 | Tang et al. ................... 709/100 |
| 6,345,072 B1 | * | 2/2002 | Liu et al. ..................... 370/501 |
| 6,363,076 B1 | * | 3/2002 | Allison et al. ............... 370/419 |

* cited by examiner

*Primary Examiner*—Jeffrey Gaffin
*Assistant Examiner*—Ilwoo Park
(74) *Attorney, Agent, or Firm*—Thomas, Kayden, Horstemeyer & Risley

(57) ABSTRACT

In general, a system and method for implementing DSL support for use by a computer having a PCI bus is disclosed. A DSL modem is allowed to simultaneously communicate data to and from the computer. In a simplified embodiment, a DSL enabling device provides both data flow control and general control functions of the DSL modem. The DSL enabling device comprises a PCI DMA arbitrator, which determines the status of a temporary memory module in response to either a transmit request from a transmit control unit or a receive request from a receive control unit, thereby arbitrating between the two control units in order to access the temporary memory module. A read/write register specifies priority between the transmit control unit and the receive control unit, as well as specifying computer memory addresses to write to and setting memory cell length. A transmit RAM temporarily stores data from the computer to the DSL modem until such time as the DSL modem instructs the transmit control unit that the DSL modem is ready to receive the data. A receive RAM temporarily stores data from the DSL modem for transmission to the computer memory until such time that the PCI DMA arbitrator instructs the receive control unit that the temporary memory module is ready to receive such data after which time a single channel DMA transfers the data from the temporary memory module to the computer.

20 Claims, 5 Drawing Sheets

PERIPHERAL COMPONENT INTERCONNECT (PCI) SINGLE CHANNEL MASTER DIRECT MEMORY ACCESS (DMA) SERVING TWO SEPARATE CHANNELS

CROSS-REFERENCE TO RELATED APPLICATIONS

This application claims priority to and the benefit of the filing date of U.S. Provisional Application Serial No. 60/111,453, filed on Dec. 9, 1998, and entitled "PCI Single Channel Master DMA Serving 2 Separate Channels," which is incorporated by reference herein in its entirety.

FIELD OF THE INVENTION

The present invention generally relates to broadband networks. More specifically, the invention is related to a single channel direct memory access block which provides digital subscriber line support for a computer using a PCI bus.

BACKGROUND OF THE INVENTION

With the advancement of broadband technology, digital subscriber line (DSL) technology provides high-speed communication access over the existing copper telephone line infrastructure, and relieves congestion thereon. DSL does this by taking advantage of an unused frequency spectrum available on standard telephone lines that can be used to carry information. While DSL technology creates channels for communicating data over the telephone lines, plain old telephone service (POTS) frequencies remain free to handle voice traffic. Therefore, only a single line is needed to transmit and receive both voice and data communication traffic.

A DSL modem provides connectivity to a computer by allowing simultaneous transmission and reception of voice and data on a single line. When the DSL modem interfaces with a PCI bus within the computer, a problem occurs because the PCI bus only allows data to be read or written at one time, and not simultaneously. Therefore, while DSL advantageously allows the simultaneous communication of voice and data, the PCI bus cannot support this simultaneous functionality.

SUMMARY OF THE INVENTION

Briefly described, the invention is a system and method for supporting DSL communication in a computer having a PCI bus. The invention allows a DSL modem to simultaneously transmit and receive data to a computer. This is performed by using a DSL enabling device, which provides both data flow control and general DSL modem control.

The DSL enabling device comprises a PCI DMA arbitrator, which determines the status of a temporary memory module in response to either a transmit request from a transmit control unit or a receive request from a receive control unit, thereby arbitrating between the transmit control unit and the receive control unit in order to access the temporary memory module. A read/write register specifies priority between the transmit control unit and the receive control unit, and specifies computer memory address locations in which to write, and also sets memory cell length.

A transmit random access memory (RAM) is used to temporarily store data communicated from the computer to the DSL modem until such time as the DSL modem instructs the transmit control unit that it is ready to receive the data. A receive RAM is used to temporarily store data destined for the computer from the DSL modem until such time that the PCI DMA arbitrator instructs the receive control unit that the temporary memory module is ready to receive such data.

The invention has numerous advantages, a few of which are delineated hereafter as examples. Note that the embodiments of the invention, which are described herein, possess one or more, but not necessarily all, of the advantages set out hereafter.

One advantage of the invention is that it provides for simultaneous communication of data between a DSL modem and a computer having a PCI bus, without incurring loss of data.

Another advantage is that it provides an efficient circuit design, having minimal cost, for using a single channel DMA to simultaneously and bi-directionally communicate between a DSL modem and a computer.

Other objects, features and advantages of the present invention will become apparent to one of reasonable skill in the art upon examination of the following drawings and detailed description. It is intended that all such additional objects, features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiments of the invention, which however should not be taken to limit the invention to the specific embodiments, but are for explanation and for better understanding. Furthermore, the drawings are not necessarily to scale, emphasis instead being placed upon clearly illustrating the principles of the invention. Finally, like reference numerals in the figures designate corresponding parts throughout the several drawings.

DESCRIPTION OF THE PREFERRED EMBODIMENT

Figure 1:
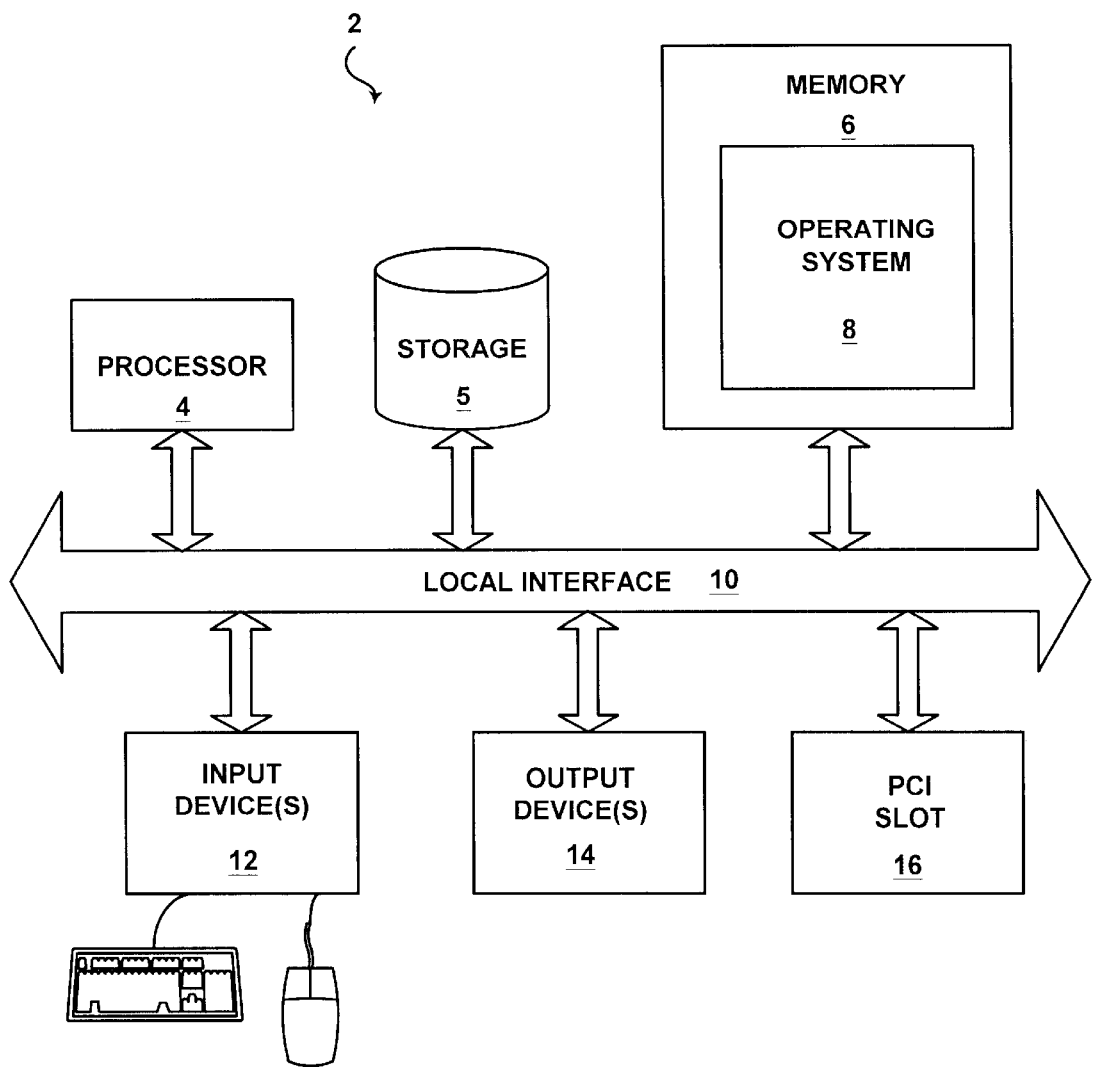
FIG. 1 depicts a typical computer system having a PCI slot therein that may accommodate the present invention if located on a peripheral card.

Referring now to the drawings, wherein like reference numerals designate corresponding parts throughout the drawings, FIG. 1 illustrates a typical computer or processor-based system 2 having a PCI slot 16 therein. FIG. 1 shows a computer system 2 generally comprising a processor 4, a storage device 5, and a computer memory 6 having an operating system 8. The processor 4 accepts data from the computer memory 6 over a local interface 10, such as a bus(es), or a dedicated path. Specifically, with regard to the preferred embodiment of the invention, the local interface 10, located in the computer 2, is a PCI bus.

The computer system 2 also includes input device(s) 12 and output device(s) 14. Generally, this system may run any of a number of different platforms and operating systems, including, but not limited to, the Unix®, WindowsNT®, SunSolaris® or any such operating system. The PCI slot 16 is attached to the local interface 10 and provides a means for a peripheral device, such as a network interface card (NIC), to attach to the computer system 2.

Figure 2:
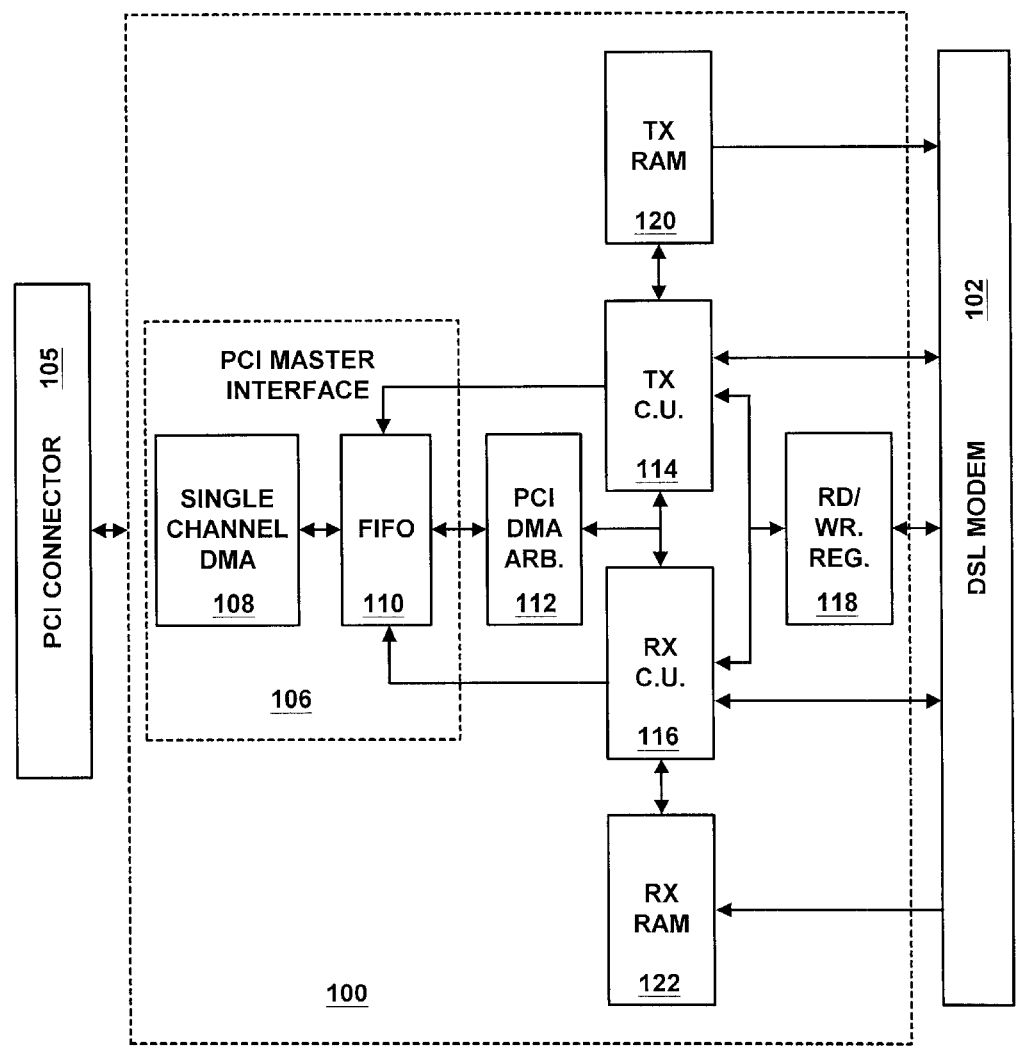
FIG. 2 illustrates the DSL enabling device, in accordance with the preferred embodiment of the invention.

FIG. 2 is a block diagram of a DSL enabling device 100, which provides necessary multiplexing logic to allow a DSL modem 102 to simultaneously transmit and receive data with the computer 2. In accordance with the preferred embodiment of the invention, the DSL enabling device 100 is located on a peripheral device, such as, but not limited to, a network interface card (NIC). A PCI connector 105, which is capable of connecting to the computer's PCI slot 16 (FIG. 1), is connected to the DSL modem 102 via the DSL enabling device 100, as shall be described in detail hereinbelow. As known in the art, the DSL modem 102, which can be any DSL device, such as, but not limited to, asymmetric DSL, and high-bit rate DSL, performs the low level aspects of DSL, such as, but not limited to, echo cancellation, bit rate control, modulation and coding, as specified by well known telecommunications standards. These aspects of DSL vary according to the type of DSL modem 102 used.

The DSL enabling device 100 provides both, data flow control, and general control functions of the DSL modem 102, as shall be described hereinbelow. Preferably, the DSL enabling device 100 transmits and receives data at approximately 10 Mbps. This reduces the unnecessary use of excessive power to run devices programmed to work on the reception and transmission of data over a network, such as, but not limited to, a wide area network (WAN). It should be noted that 10 Mbps is simply a maximum bit rate specified for DSL applications, and is not a limitation on data transmission and reception by the DSL enabling device 100 since the bit rate may be changed according to data transfer and reception needs.

In accordance with FIG. 2, a PCI master interface 106 is capable of being attached to the PCI slot 16 via the PCI connector 105, as required by the PCI special interest group (PCISIG) standard. The PCI master interface 106 receives data from the computer 2 via the PCI slot 16. The PCI master interface 106 comprises a single channel DMA 108 and a temporary memory element 110. The single channel DMA 108 is capable of individually receiving or transmitting data, but not receiving and transmitting data simultaneously. The temporary memory element 110, preferably referred to as a FIFO (first in first out), provides a temporary storage space for data which is either transmitted from the computer 2 for transmission to the DSL modem 102, or received from the DSL modem 102 for transmission to the computer 2.

The FIFO 110, located in the PCI master interface 106, is connected to a PCI DMA arbitrator 112, which is also connected to a transmit control unit 114 and a receive control unit 116. The PCI DMA arbitrator 112 determines the status of the FIFO 110 in response to either a transmit request from the transmit control unit 114, or a receive request from the receive control unit 116. Therefore, the PCI DMA arbitrator 112 determines when the transmit control unit 114 and receive control unit 116 may access the FIFO 110.

A read/write register 118 receives control signals from device drivers programmed in the computer memory 6, thereby assigning priority to the information contained in the transmit and receive control units 114, 116, respectively. The read/write register 118 also supplies information regarding which memory locations in the computer memory 6 to read from and to write to. The read/write register 118 specifies addresses in the computer memory 6 to write to, as well as sets the length of memory cells in the computer memory 6 to which data may be written. Furthermore, the read/write register 118 programs parameters to the transmit and receive control units 114, 116, thereby controlling the size of memory which they use during data transfers. The transmit and receive control units 114, 116 also provide a clock signal, which, as known in the art, is derived from a PCI chipset, and transmitted, via the PCI bus 10, to the DSL modem 102 for purposes of data sampling. The transmit and receive control units 114, 116 also provide hand shaking signals to the DSL modem 102, wherein such hand shaking signals may include, but are not limited to, transmission cell available (TXCLAV), transmission enable (TXEN), receive cell available (RXCLAV), and receive enable (RXEN).

A transmit memory 120, which may be any commonly available memory, and in the preferred embodiment of the invention is a random access memory (RAM), is connected to the transmit control unit 114. The transmit RAM 120 temporarily stores data received from the computer 2 and destined for the DSL modem 102 until such time as the DSL modem 102 instructs the transmit control unit 114 that it is ready to receive such data.

A receive memory 122, which may be any commonly available memory, and in the preferred embodiment of the invention is a random access memory (RAM), is connected to the receive control unit 116 and the DSL modem 102. The receive RAM 122 temporarily stores data received from the DSL modem 102 and destined for the computer memory 6. As explained hereinbelow, the receive RAM 122 temporarily stores the DSL data until such time that the PCI DMA arbitrator 112 instructs the receive control unit 116 that the FIFO 110 is ready to receive such data.

It should be noted that while the transmit RAM 120 and receive RAM 122 have been described with reference to two separate modules, a single RAM module may be used. As such, a portion of the single RAM module may be allocated for transmission of data from the computer 2 to the DSL modem 102, and a portion of the single RAM may be allocated for reception of data from the DSL modem 102.

Figure 3:
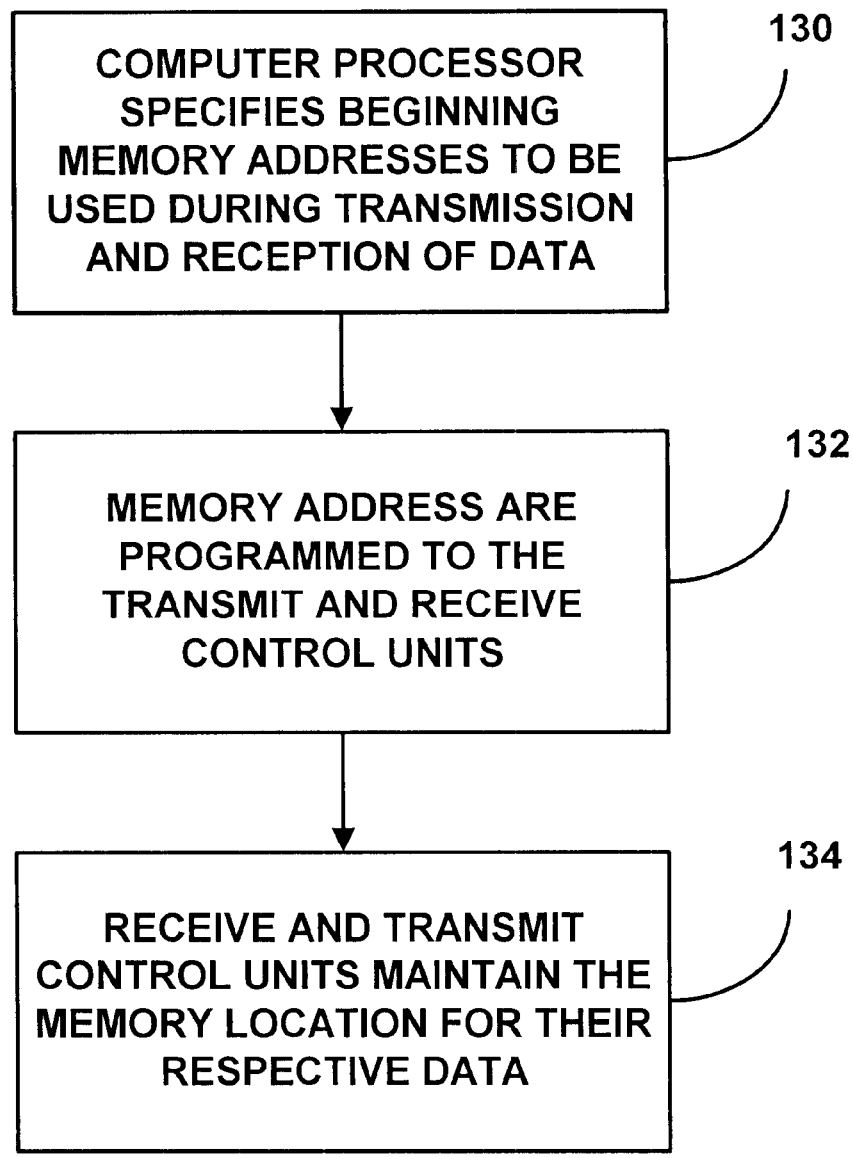
FIG. 3 is a flow chart functionally depicting control functions performed prior to the PCI access device communicating with the DSL modem.

FIG. 3 is a flow chart illustrating the control functions performed by the computer and DSL enabling device, prior to the DSL enabling device 100 either receiving or transmitting data from the computer 2 or to the DSL modem 102. As known in the art, when the computer 2 is activated, it identifies all peripheral devices and determines their demand for computer memory and input/output space. As such, the computer processor 4 specifies beginning memory addresses, located in its memory, to be used by the single channel DMA 108 during transmission and reception of data (block 130).

Once the computer processor 4 identifies the memory addresses, the addresses are programmed to the transmit and receive control units 114, 116 respectively (block 132), after which the control units 114, 116 handle their own respective memory addresses (block 134). In other words, both the receive control unit 116 and the transmit control unit 114 are responsible for maintaining memory locations for their respective data.

Figure 4:
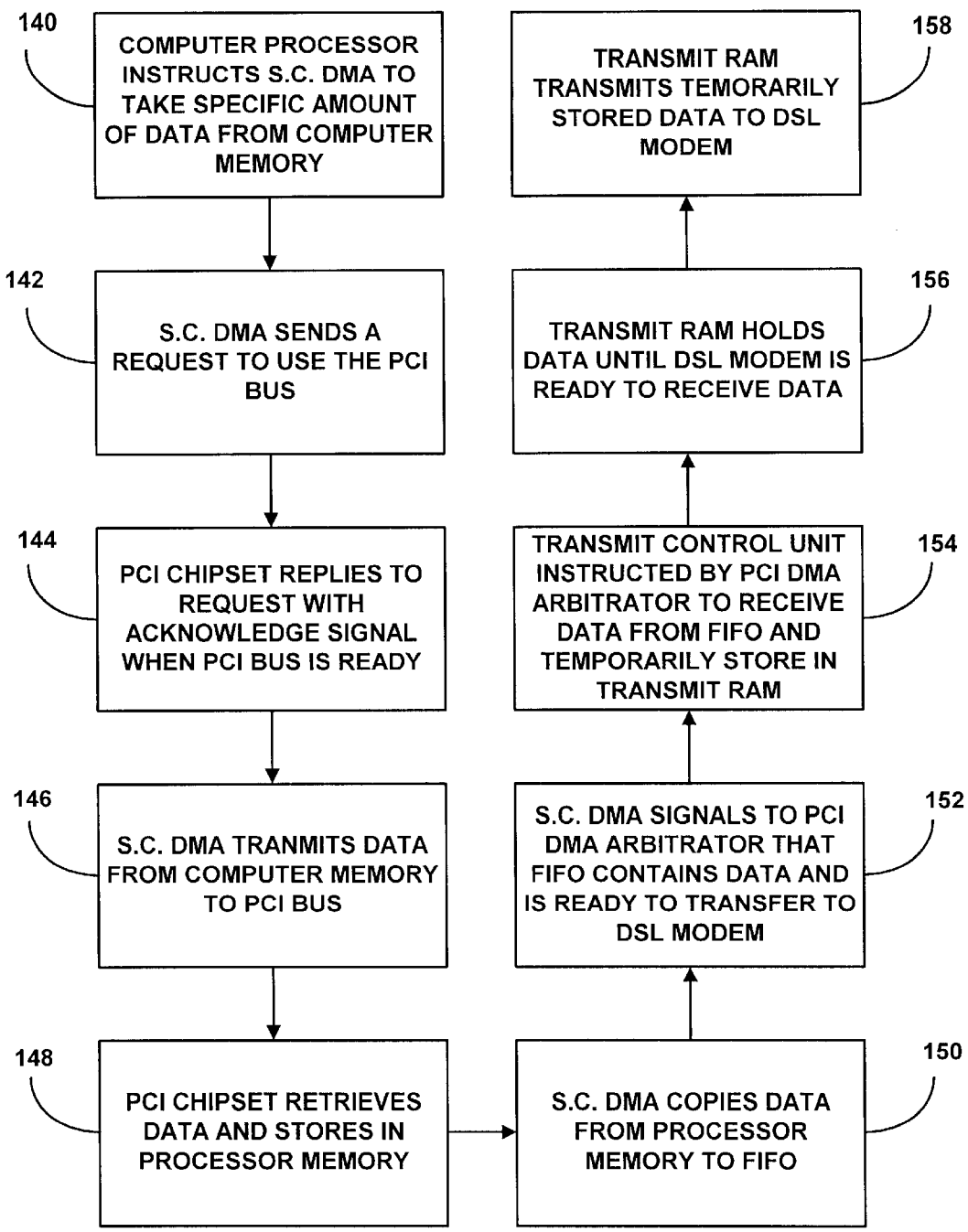
FIG. 4 is a flow chart functionally depicting the reception of data from the DSL modem.

Referring now to FIG. 4, the transmission of data from the computer memory 6 to the DSL modem 102 is further illustrated via flowchart. When transmitting data from the computer 2 to the DSL modem 102, the computer processor 4 instructs the single channel DMA 108 to retrieve a specific amount of data from the computer memory 6 (block 140). As such, the single channel DMA 108 sends a request to use the PCI bus 10 (block 142), which request is received by a PCI control chipset. The PCI control chipset replies to the request with an acknowledge signal when the PCI bus 10 is available for use (block 144). Once access to the PCI bus 10 is granted to the single channel DMA 108, the DMA 108 transfers data from the computer memory 6 to the PCI bus 10 in accordance with the type of transmission request (block 146). The type of transmission request specifies factors such as whether the request is a read or write command, and specifies the size of the data to be placed on the PCI bus 10 (8, 16, 32, or 64 bits).

While the data is placed on the PCI bus 10, the PCI control chipset retrieves the data from the PCI bus 10 and stores it in a memory located in the processor 4 (block 148). In response, the single channel DMA 108 copies the data from the processor 4 memory to the FIFO 110 (block 150). It should be noted herein that the same sections of the FIFO 110 are used for both receiving and transmitting data to and from the DSL modem 102, respectively. The single channel DMA 108 then signals the PCI DMA arbitrator 112 that the FIFO 110 contains data and is ready to transfer such data to the DSL modem 102 (block 152). In response, the transmit control unit 114 is instructed by the PCI DMA arbitrator 112 to receive the data from the FIFO 110 and temporarily store it in the transmit RAM 120 (block 154). The transmit RAM 120 then stores the data until such time that the DSL modem 102 is ready to receive the data (block 156). When the DSL modem 102 is ready to receive the data, it signals the transmit control unit 114.

When the DSL modem 102 is ready to receive data from the transmit RAM 120, as evidenced by a signal to the transmit control unit 114 signifying that it is ready, the transmit RAM 120 transmits the temporarily stored data to the DSL modem 102 (block 158). In addition, once data has been sent to the DSL modem 102, the transmit control unit 114 retrieves the next cell of data from the FIFO 110 and temporarily stores it in the transmit RAM 120. This pattern is continued until all relevant data has been transmitted to the DSL modem 102.

Figure 5:
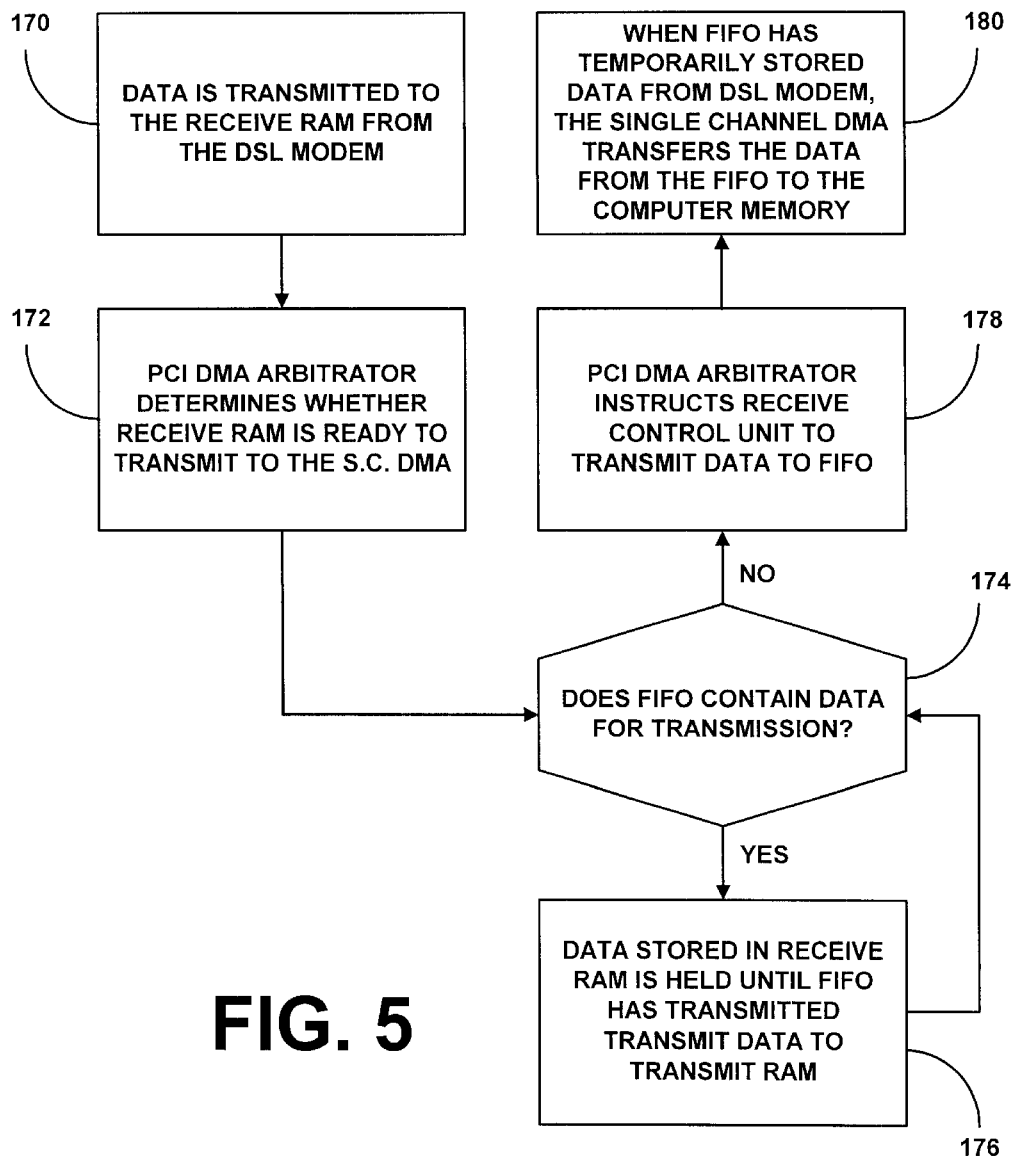
FIG. 5 is a flow chart diagram functionally depicting the transmission of data from the computer to the DSL modem.

FIG. 5 is a flow chart illustrating the reception of data from the DSL modem 102 to the computer memory 6 is illustrated. Data is transmitted to the receive RAM 122 from the DSL modem 102, wherein the receive RAM 122 temporarily stores the data (block 170). As previously mentioned, the locations for storing the received data is predefined during activation of the computer 2.

In addition to the PCI DMA arbitrator 112 being capable of determining the status of the FIFO 110, it is also capable of determining whether the receive RAM 122 is ready to transmit stored data to the FIFO 110. In response to the PCI DMA arbitrator 112 recognizing that information is contained in the receive RAM 122 (block 172), the PCI DMA arbitrator 112 determines whether the FIFO 110 contains data which is to be transmitted to the transmit RAM 120 for temporary storage (block 174). If the FIFO 110 does contain data for transmission, the data stored in the receive RAM 122 is held until such time that the FIFO 110 has transmitted the transmit data to the transmit RAM 120 (block 176).

In accordance with the preferred embodiment of the invention, priority is given to the receive path because the receive rate is higher than the transmit rate. As an example, an ADSL modem's receive rate is approximately 7 Mb/sec while the transmit rate is approximately 1 Mb/sec. This priority is predefined by the computer processor 4, via the read/write register 118, during initial control allocation performed during activation of the computer 2.

When the PCI DMA arbitrator 112 has determined that the FIFO 110 is ready to receive the data that is temporarily stored in the receive RAM 122, the PCI DMA arbitrator 112 instructs the receive control unit 116 to transmit this stored data to the FIFO 110 (block 178). Finally, when the FIFO 110 has received the temporarily stored data, the single channel DMA 108 transfers the data from the FIFO 110 to the computer memory 6 (block 180).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments(s) of the invention without departing substantially from the spirit and principles of the invention. All such modifications and variations are intended to be included herein within the scope of the present invention and protected by the following claims.

The following is claimed:

1. A method for supporting digital subscriber line (DSL) communication in a computer having a PCI bus, the method comprising the steps of:

configuring a single channel DMA to read and write to a series of memory addresses located in a computer processor memory during communication of data between said DSL modem and said computer;

configuring a transmit control unit and a receive control unit to use said series of memory addresses for writing data and reading data;

transmitting data, in response to a transmission request from said computer, from said computer to a temporary memory module until said transmit control unit receives said data from said temporary memory module and temporarily stores said data in a transmit memory, and holding said data in said transmit memory until said DSL modem is ready to receive said data; and receiving said data from said DSL modem, in a receive memory, wherein said data is temporarily stored until said temporary memory module is ready to receive said data, upon which said receive control unit transmits said data to said temporary memory module, and said single channel DMA transfers said data from said temporary memory module, to said computer.

2. The method of claim 1, wherein said step of transmitting data from said computer further comprises the step of instructing said single channel DMA to retrieve said data from a computer memory located in said computer.

3. The method of claim 2, wherein said step of transmitting data from said computer further comprises the steps of:

requesting use of said PCI bus;

when said PCI bus is ready, transmitting said data from said computer memory to said PCI bus;

retrieving said data from said PCI bus and storing said data in a memory located in said computer processor; and copying said data from said memory located in said computer processor, to said temporary memory module.

4. The method of claim 1, wherein said step of receiving data is given priority over said step of transmitting data.

5. A system for providing support for a digital subscriber line (DSL) modem, for use by a computer having a PCI bus, comprising:

a single channel DMA connected to said computer via a PCI connector, said single channel DMA capable of transmitting data to said computer and to a temporary memory module, wherein said temporary memory element provides temporary storage for data which is, either transmitted from said computer, via said single channel DMA, to said DSL modem, or received from said DSL modem for transmitting to said computer, via said single channel DMA;

a transmit control unit which is connected to said temporary memory element and capable of retrieving data from said temporary memory element;

a receive control unit which is connected to said temporary memory element and capable of transmitting data to said temporary memory element;

a PCI DMA arbitrator connected to said transmit control unit, said receive control unit and said temporary memory element, said PCI DMA arbitrator capable of arbitrating between said transmit control unit and said receive control unit to access said temporary memory element;

a transmit memory, located between said transmit control unit and said DSL modem, said transmit memory capable of temporarily storing data from said computer to said DSL modem until said DSL modem instructs said transmit control unit to deliver said data; and a receive memory, located between said receive control unit and said DSL modem, said receive memory capable of temporarily storing data received from said DSL modem until said PCI DMA arbitrator instructs said receive control unit that said temporary memory element is ready to receive said data.

6. The system of claim 5, wherein said system is located on a network interface card.

7. The system of claim 5, wherein said transmit memory and said receive memory are located on a single memory module.

8. The system of claim 5, wherein said single channel DMA is capable of either receiving data, or transmitting data, at once.

9. The system of claim 5, wherein said process of arbitrating is further defined by, determining the status of the temporary memory element in response to either a receive request from said receive control unit, or a transmit request from said transmit control unit.

10. The system of claim 5, further comprising a read/write register.

11. The system of claim 10, wherein said read/write register receives a series of control signals from said computer which specify priority between said transmit control unit and said receive control unit.

12. The system of claim 5, wherein said transmit control unit and said receive control unit provide handshaking signals to said DSL modem.

13. A system for providing support for a digital subscriber line (DSL) modem, for use by a computer having a PCI bus, comprising:

a means for transmitting data, either to said computer, or to a temporary memory element, wherein said temporary memory element provides temporary storage for data which is, either transmitted from said computer, via said means for transmitting data, to said DSL modem, or received from said DSL modem for transmitting to said computer, via means of transmitting data;

a means for retrieving data from said temporary memory element;

a means for transmitting data to said temporary memory element;

a means for arbitrating between said means for retrieving data and said means for transmitting data to access said temporary memory element;

a means for temporarily storing data from said computer to said DSL modem until said DSL modem instructs said means for transmitting data to deliver said data; and a means for temporarily storing data received from said DSL modem until said means for arbitrating instructs said means for retrieving data that said temporary memory element is ready to receive said data.

14. The system of claim 13, wherein said system is located on a network interface card.

15. The system of claim 13, wherein said means for temporarily storing data from said computer to said DSL modem and said means for temporarily storing data received from said DSL modem, are located on a single memory module.

16. The system of claim 13, wherein said means for arbitrating is capable of either receiving data, or transmitting data, at once.

17. The system of claim 13, wherein said process of arbitrating is further defined by, determining the status of the temporary memory element in response to either a receive request from said means for transmitting data, or a transmit request from said means for retrieving data.

18. The system of claim 13, further comprising a read/write register.

19. The system of claim 18, wherein said read/write register receives a series of control signals from said computer which specify priority between said means for retrieving data and said means for transmitting data.

20. The system of claim 13, wherein said means for retrieving data and said means for transmitting data provide handshaking signals to said DSL modem.

* * * * *